(12) United States Patent
Reichert LaMorte et al.

(10) Patent No.: US 12,730,119 B2
(45) **Date of Patent: *Sep. 8, 2026**

(54) TELE-INSPECTION SYSTEM AND METHOD

(71) Applicant: Edison Welding Institute, Inc., Columbus, OH (US)

(72) Inventors: Constance Reichert LaMorte, Columbus, OH (US); Paul A. Blomquist, Wells, ME (US); Lindsey Lindamood, Columbus, OH (US); Howard Marotto, Columbus, OH (US)

( * ) Notice: Subject to any disclaimer, the term of this patent is extended or adjusted under 35 U.S.C. 154(b) by 323 days.

This patent is subject to a terminal disclaimer.

(21) Appl. No.: 18/423,793

(22) Filed: Jan. 26, 2024

(65) Prior Publication Data

US 2025/0244347 A1 Jul. 31, 2025

(51) Int. Cl.
*G01N 35/00* (2006.01)

(52) U.S. Cl.
CPC ... *G01N 35/0099* (2013.01); *G01N 35/00584* (2013.01)

(58) Field of Classification Search
CPC .... G06V 20/52; B23K 9/0953; B23K 9/1087; B25J 9/1689; B25J 13/02; B25J 13/006; B25J 13/025; G05B 19/4155; G05B 19/423; G01B 11/002; G01B 15/00; G06F 3/011; G06F 3/0484; G06F 3/0488; G09B 19/24; G03B 37/005; G08C 17/02; G01N 35/0099; G01N 35/00584
See application file for complete search history.

(56) References Cited

U.S. PATENT DOCUMENTS

2016/0229050 A1* 8/2016 Wang .................... B25J 13/025

* cited by examiner

*Primary Examiner* — Brandi N Hopkins

(57) ABSTRACT

Systems and methods for controlling an inspection process used in a manufacturing environment, comprising installing equipment used for a inspection process in a manufacturing environment; positioning a plurality of sensors within the manufacturing environment wherein the plurality of sensors are configured to gather data from the manufacturing environment; connecting at least one processor to the plurality of sensors, wherein the at least one processor includes software for receiving data from the plurality of sensors and the inspection equipment; and wherein the software on the processor mathematically transforms the motion input into corresponding motion commands, wherein the material removal equipment, which is physically remote from the at least one controller, executes the motion commands in real-time during the manufacturing inspection process.

18 Claims, 7 Drawing Sheets

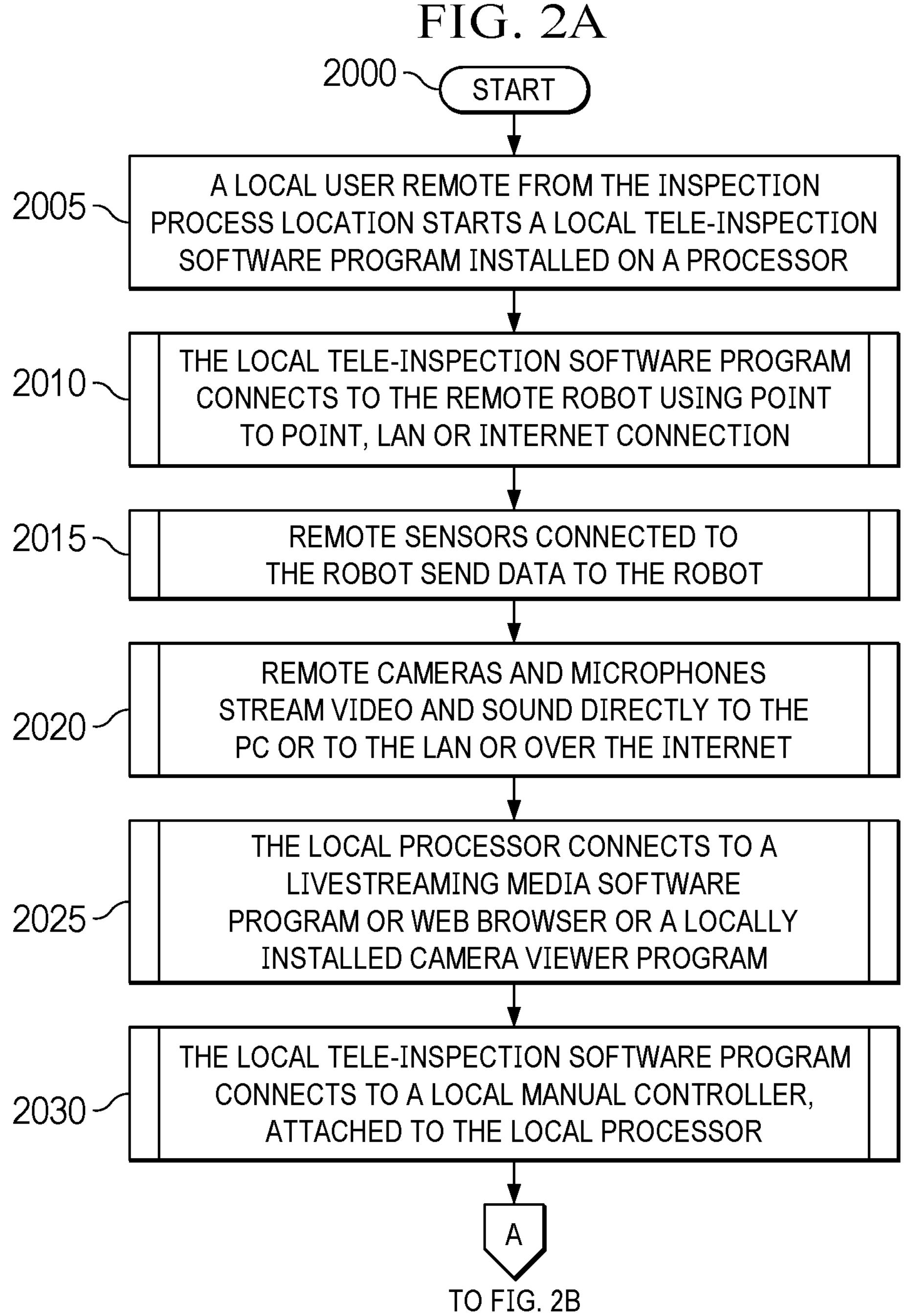
FIG. 2A
2000
START
2005
A LOCAL USER REMOTE FROM THE INSPECTION PROCESS LOCATION STARTS A LOCAL TELE-INSPECTION SOFTWARE PROGRAM INSTALLED ON A PROCESSOR
2010
THE LOCAL TELE-INSPECTION SOFTWARE PROGRAM CONNECTS TO THE REMOTE ROBOT USING POINT TO POINT, LAN OR INTERNET CONNECTION
2015
REMOTE SENSORS CONNECTED TO THE ROBOT SEND DATA TO THE ROBOT
2020
REMOTE CAMERAS AND MICROPHONES STREAM VIDEO AND SOUND DIRECTLY TO THE PC OR TO THE LAN OR OVER THE INTERNET
2025
THE LOCAL PROCESSOR CONNECTS TO A LIVESTREAMING MEDIA SOFTWARE PROGRAM OR WEB BROWSER OR A LOCALLY INSTALLED CAMERA VIEWER PROGRAM
2030
THE LOCAL TELE-INSPECTION SOFTWARE PROGRAM CONNECTS TO A LOCAL MANUAL CONTROLLER, ATTACHED TO THE LOCAL PROCESSOR
A
TO FIG. 2B

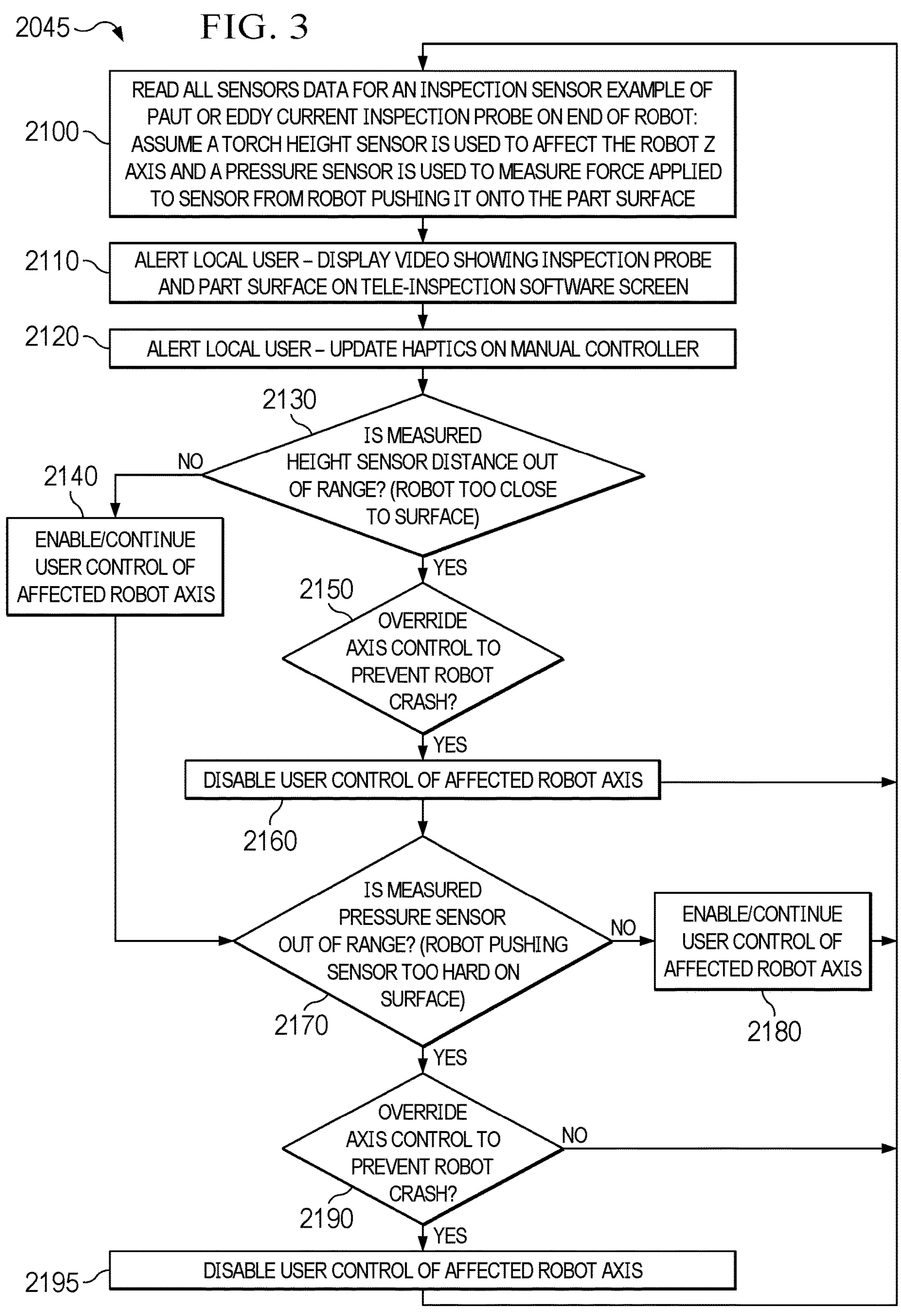

2045
FIG. 3
2100
READ ALL SENSORS DATA FOR AN INSPECTION SENSOR EXAMPLE OF PAUT OR EDDY CURRENT INSPECTION PROBE ON END OF ROBOT: ASSUME A TORCH HEIGHT SENSOR IS USED TO AFFECT THE ROBOT Z AXIS AND A PRESSURE SENSOR IS USED TO MEASURE FORCE APPLIED TO SENSOR FROM ROBOT PUSHING IT ONTO THE PART SURFACE
2110
ALERT LOCAL USER – DISPLAY VIDEO SHOWING INSPECTION PROBE AND PART SURFACE ON TELE-INSPECTION SOFTWARE SCREEN
2120
ALERT LOCAL USER – UPDATE HAPTICS ON MANUAL CONTROLLER
2130
IS MEASURED HEIGHT SENSOR DISTANCE OUT OF RANGE? (ROBOT TOO CLOSE TO SURFACE)
NO
2140
ENABLE/CONTINUE USER CONTROL OF AFFECTED ROBOT AXIS
YES
2150
OVERRIDE AXIS CONTROL TO PREVENT ROBOT CRASH?
YES
DISABLE USER CONTROL OF AFFECTED ROBOT AXIS
2160
IS MEASURED PRESSURE SENSOR OUT OF RANGE? (ROBOT PUSHING SENSOR TOO HARD ON SURFACE)
2170
NO
ENABLE/CONTINUE USER CONTROL OF AFFECTED ROBOT AXIS
2180
YES
OVERRIDE AXIS CONTROL TO PREVENT ROBOT CRASH?
NO
2190
YES
2195
DISABLE USER CONTROL OF AFFECTED ROBOT AXIS

TELE-INSPECTION SYSTEM AND METHOD

BACKGROUND

The disclosed technology relates in general to industrial manufacturing and fabricating systems, devices, and processes and more specifically to an inspection system operated from a remote location, also referred to as a "tele-manufacturing" or "tele-inspection" system.

Welding inspection and crack detection are processes that are routinely conducted on parts and surfaces present within manufacturing environments. Phased array ultrasonic testing (PAUT) is one technique used for a variety of welding inspections. PAUT is an advanced non-destructive inspection technique that uses ultrasonic testing probes to emit transducer beams at various angles and depths, thereby allowing accurate inspection of surface areas and parts. Eddy current testing is another non-destructive inspection technique commonly used to detect welding flaws by using electromagnetic induction wherein an electrically energized probe is positioned near a part or surface to examine variations in conductivity along the part or material.

As an industrial process, weld inspection (and industrial welding generally) is currently challenged by a variety of factors including a decreasing number of skilled users; a lack of individuals wanting to enter what are traditionally considered to be "manual" trades; and an ever-increasing list of hazards and limitations related to welding, grinding, and other hot work activities that make finding and keeping experienced users difficult. Additionally, efforts within industry to optimize weight and space in manufacturing processes have resulted in the construction of manufacturing facilities that are basically inaccessible to humans. Accordingly, there is an ongoing need for welding-related systems, processes, and methods that permit qualified users to enter and remain in the workforce regardless of physical limitations, age, or other perceived obstacles such as those described above.

SUMMARY

The following provides a summary of certain example implementations of the disclosed technology. This summary is not an extensive overview and is not intended to identify key or critical aspects or elements of the disclosed technology or to delineate its scope. However, it is to be understood that the use of indefinite articles in the language used to describe and claim the disclosed technology is not intended in any way to limit the described technology. Rather the use of "a" or "an" should be interpreted to mean "at least one" or "one or more".

One implementation of the disclosed technology provides a first method for controlling an inspection process used in a manufacturing environment. This method comprises installing equipment used for or related to a manufacturing inspection process in a manufacturing environment; positioning a plurality of sensors within the manufacturing environment in proximity to the inspection equipment, wherein the plurality of sensors are configured to gather data from the manufacturing environment; connecting at least one processor to the plurality of sensors, wherein the at least one processor includes software for receiving data from the plurality of sensors and the inspection equipment; and connecting at least one manual controller to the processor, wherein the at least one manual controller receives motion input from a user of the manual controller, wherein the software on the processor mathematically transforms the motion input into corresponding motion commands that are sent to the inspection equipment by the processor, wherein the inspection equipment, which is physically remote from the at least one controller, executes the motion commands in real-time during the manufacturing inspection process.

The inspection equipment may include a robot having an end effector for evaluating the integrity of welded material, wherein the end effector includes a PAUT probe, an Eddy current probe, or combinations thereof. Implementations of the method further comprise, from at least one of the plurality of sensors, measuring a distance between the end effector and the welded material; and disabling the user's control of the inspection equipment if the distances varies from a predetermined operating distance range. Implementations of the method further comprise, by the software, reading the measured distance between the end effector and the welded material; providing a haptic feedback response to the manual controller based on the data from the plurality of sensors and the inspection equipment; and updating the haptic feedback response to the manual controller based on the measured distance. Implementations of the method further comprise, from at least one of the plurality of sensors, measuring a pressure applied between the end effector and the welded material; and disabling the user's control of the inspection equipment if the pressure varies from a predetermined operating pressure range. Implementations of the method further comprise reading the measured pressure applied between the end effector and the welded material; providing a haptic feedback response to the manual controller based on the data from the plurality of sensors and the inspection equipment; and updating the haptic feedback response to the manual controller based on the measured pressure. The at least one manual controller may be a hand-held stylus, a computer mouse, or a joystick. The robot may move with at least six degrees of freedom. Implementations of the method further comprise providing a computer network across which the processor communicates with the inspection equipment. Implementations of the method further comprise displaying a real-time video of the manufacturing environment to the user during the inspection process.

Another implementation of the disclosed technology provides a second method for controlling an inspection process used in a manufacturing environment. This method comprises installing equipment used for or related to a manufacturing inspection process in a manufacturing environment; positioning a plurality of sensors within the manufacturing environment in proximity to the inspection equipment, wherein the plurality of sensors are configured to gather data from the manufacturing environment; connecting at least one processor to the plurality of sensors, wherein the at least one processor includes software for receiving data from the plurality of sensors and the inspection equipment; connecting at least one manual controller to the processor, wherein the at least one manual controller receives motion input from a user of the manual controller, wherein the software on the processor mathematically transforms the motion input into corresponding motion commands that are sent to the inspection equipment by the processor, wherein the inspection equipment, which is physically remote from the at least one controller, executes the motion commands in real-time during the manufacturing inspection process; and displaying a real-time video of the manufacturing environment to the user during the inspection process.

The inspection equipment may include a robot having an end effector for evaluating the integrity of welded material, wherein the end effector includes a PAUT probe, an Eddy current probe, or combinations thereof. Implementations of the method further comprise, from at least one of the plurality of sensors, measuring a distance between the end effector and the welded material; and disabling the user's control of the inspection equipment if the distances varies from a predetermined operating distance range. Implementations of the method further comprise, by the software, reading the measured distance between the end effector and the welded material; providing a haptic feedback response to the manual controller based on the data from the plurality of sensors and the inspection equipment; and updating the haptic feedback response to the manual controller based on the measured distance. Implementations of the method further comprise, from at least one of the plurality of sensors, measuring a pressure applied between the end effector and the welded material; and disabling the user's control of the inspection equipment if the measured pressure varies from a predetermined operating pressure range. Implementations of the method further comprise reading the measured pressure applied between the end effector and the welded material; providing a haptic feedback response to the manual controller based on the data from the plurality of sensors and the inspection equipment; and updating the haptic feedback response to the manual controller based on the measured pressure. Implementations of the method further comprise continuing the user's control of the inspection equipment if the measured pressure is within the predetermined operating pressure range. The at least one manual controller may be a hand-held stylus, a computer mouse, or a joystick. The robot may move with at least six degrees of freedom. Implementations of the method further comprise providing a computer network across which the processor communicates with the inspection equipment.

It should be appreciated that all combinations of the foregoing concepts and additional concepts discussed in greater detail below (provided such concepts are not mutually inconsistent) are contemplated as being part of the technology disclosed herein and may be implemented to achieve the benefits as described herein. Additional features and aspects of the disclosed system, devices, and methods will become apparent to those of ordinary skill in the art upon reading and understanding the following detailed description of the example implementations. As will be appreciated by the skilled artisan, further implementations are possible without departing from the scope and spirit of what is disclosed herein. Accordingly, the descriptions provided herein are to be regarded as illustrative and not restrictive in nature.

BRIEF DESCRIPTION OF THE DRAWINGS

The accompanying drawings, which are incorporated into and form a part of the specification, schematically illustrate one or more example implementations of the disclosed technology and, together with the general description given above and detailed description given below, serve to explain the principles of the disclosed subject matter, and wherein:

FIGS. 2A-2B are flow charts depicting an example method or process for using the tele-inspection system depicted in FIG. 1;

FIG. 3 is a flow chart illustrating an example stepwise process for gathering and interpreting data from sensors located in a remote manufacturing environment and controlling the operation of a robot within the manufacturing environment in conjunction with the method depicted in FIGS. 2A-2B and based on the gathered data;

DETAILED DESCRIPTION

Figure 1:
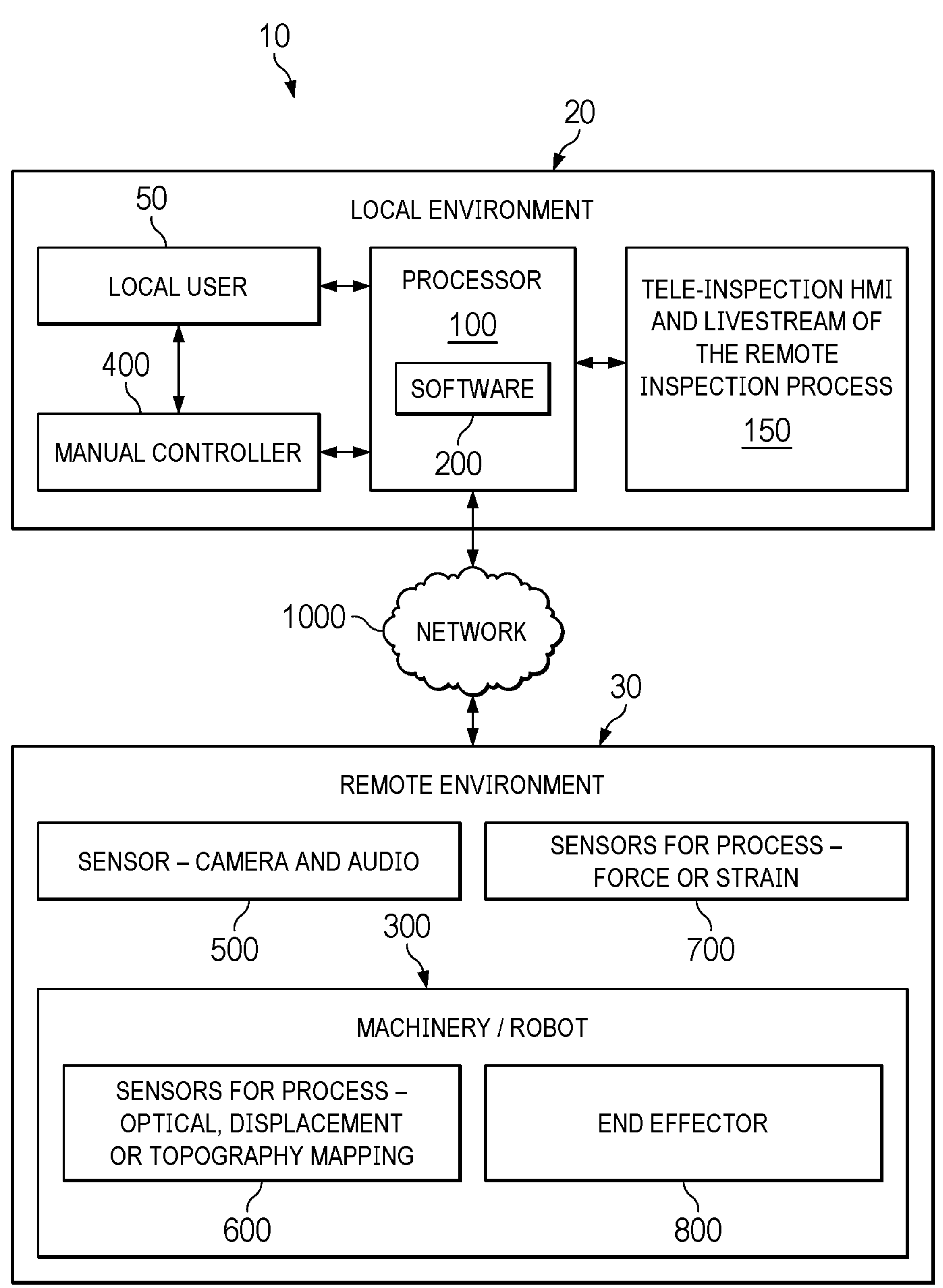
FIG. 1 is a simplified block diagram of an example implementation of the disclosed tele-inspection system showing the basic components of the system and the location of the components relative to one another.

Example implementations are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the disclosed technology. Accordingly, the following implementations are set forth without any loss of generality to, and without imposing limitations upon, the claimed subject matter.

The examples discussed herein are examples only and are provided to assist in the explanation of the apparatuses, devices, systems, and methods described herein. None of the features or components shown in the drawings or discussed below should be taken as required for any specific implementation of any of these the apparatuses, devices, systems or methods unless specifically designated as such. For ease of reading and clarity, certain components, modules, or methods may be described solely in connection with a specific Figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

U.S. Patent Publication No. 2023/0112463 is relevant to the disclosed technology and the entire contents thereof are expressly incorporated by reference herein and made part of this patent application for all purposes. U.S. Patent Publication No. 2023/0112463 discloses tele-manufacturing and tele-welding systems and methods that enable the operation of industrial equipment from one or more locations that are physically remote from the environment in which manufacturing is occurring. Tele-operation is most commonly associated with robotics and mobile robots, but may be applied to an entire range of circumstances in which a device or machine is operated by a person from a distance. Tele-welding systems permit an individual to direct a welding process from a remote location by controlling welding arc on, welding arc off, welding travel speed, and welding torch angles and motions, thereby permitting the individual to make various decisions regarding the welding of a part that is not in their immediate visual or auditory range.

Tele-welding and tele-inspection differ from remote welding and inspection in that the welding and weld-inspection machinery at the remote location (e.g., robot, manipulator, mechanization, automation, etc.) is not running an independent program or motion plan. The person (operator) who is remote from the machinery is in direct control of the welding and weld-inspection machinery and makes decisions to move the machinery by use of a hand-held stylus device or similar device. Furthermore, tele-manufacturing systems differ from virtual reality (VR) in that the hand-held stylus is an actual physical device that has various degrees of rotational freedom and provides encoded position information from each axis when queried and converts the motion of the stylus device into motion on a live articulated machine (robot) with various degrees of rotational freedom. Regarding the local manipulator (e.g., stylus) to remote machinery (e.g., robot) motion in implementations wherein the stylus (controller) and articulated machine (robot) both include six degrees of freedom, the robot six degrees of freedom includes X, Y, Z, roll, pitch and yaw (Rx, Ry, Rz) direction motions generated with the six coordinated axes of the articulated robot. The six degrees of freedom of the stylus device include X, Y and Z direction motion and three additional gimbaled axes that provide the additional three degrees of freedom.

Tele-welding and tele-inspection systems differ from off-line planning control systems in that motion control is done in real-time with only sub-second delays or latency between user movement of the hand-held stylus and motion produced on remote machinery. The difference between the disclosed control systems and a traditional master-follower control system is that the degrees of freedom of motion on the stylus do not produce the same degrees of freedom motion result on the robot, i.e., the motion output of the robot and hand-held stylus are not identical. Additionally, the number of degrees of freedom present on the hand held stylus device (or other type of controller) does not necessarily match the number of degrees of freedom on the robot.

The disclosed technology, which is referred to as "tele-inspection", includes inspection systems and methods that enable the inspection of welded material from one or more locations that are physically remote from where the inspection is actually occurring. The disclosed tele-inspection system permits an individual to control inspection equipment from a remote location to evaluate the integrity of welded material on the surface of a part or component. The individual can control the inspection equipment's on/off, applied force, and positions, angles, and ranges of motion. The inspection equipment may include a robot having any suitable end effector used in manufacturing inspections, including but not limited to, PAUT probes and Eddy current probes.

The disclosed tele-inspection system includes components similar to the components included in the tele-welding system described in U.S. Patent Publication No. 2023/0112463. FIG. 1 provides a simplified block diagram of an example implementation of the disclosed tele-inspection system 10 showing the basic components thereof. With reference to FIG. 1, an example tele-inspection system 10 includes various components that when used together allow local user 50 who is in direct contact with manual controller 400 to control weld-inspection machinery or other robotic machinery 300 that performs manual movements based on and coordinated with the movements of manual controller 400, despite machinery 300 being located in remote environment 30, which is physically separate from local user 50 in local environment 20. An example implementation of tele-inspection system 10 includes processor 100; control software 200; remote machinery/robot 300; manual controller 400; environmental sensors 500; three-dimensional scanning sensors 600; process sensors 700; and end effector 800.

Processor 100, which may be a computer or computing device that includes various control hardware, runs an overall program for communicating with remote devices over network 1000 using wired or wireless protocols. Processor 100 is connected to manual controller 400, which may be a hand-held stylus, joystick, mouse, or any other electronic or computer-compatible motion control device having at least one degree of rotational freedom. Processor 100 is connected to the Internet and opens a URL/webpage or digital media player software using an Internet browser or similar program. In some implementations, other open or closed computer networks are utilized.

Control software 200 runs on processor 100 and enables communication with and between remote machinery 300 across network 1000. In an example implementation, control software 200 uses digitized environmental data (e.g., point clouds) provided by three-dimensional scanning sensors 600 (such as, for example, laser detection and ranging (LIDAR), blue, white, or stereo scanning sensors) and executes mathematical transformations to convert a digital environment into haptic feedback felt by local user 50 while holding manual controller 400, in real time, thereby providing local user 50 with a physical sense or physical interpretation of an actual working environment. Control software 200 also allows local user 50 to initiate or stop communication with remote machinery 300. Remote machinery 300 can include any type of inspection equipment, including a robot and robot controller having end effector 800 for evaluating the integrity of welded material. End effector 800 may include a PAUT probe, an Eddy current probe, or the like, or combinations thereof. The robot and robot controller hardware are typically controlled by either open source or proprietary communication protocols.

Control software 200, an example of which is specific to tele-inspection system 10, includes an executable application that can be run on the computer of a remote user, on a computer located in the same environment as machinery 300, or on the robot controller system. Software 200 provides a user interface, or human machine interface (HMI) screen 150, for allowing user 50 to interact with manual controller 400 and remote machinery 300 in a simultaneous manner. Software 200 provides a connection to remote machinery 300 using a local area network (LAN), intranet, or the Internet, (collectively, network 1000) for the purpose of controlling remote machinery 300. Software 200 receives input from user 50 by way of the user interface or HMI screen 150 to begin or end a tele-grinding process, to set or change process settings or parameters, or to set or change manual controller 400 parameters. System software 200 provides a process for communicating with at least one locally connected manual controller 400, thereby allowing user 50 to directly manipulate manual controller 400 while querying manual controller 400 positions and converting the positions to resultant movement of the remote machinery 300. In other implementations, the grinding start/stop process is accomplished using buttons or other additional data input/output features included on manual controller 400.

Controller 400 may be a manually operated device such as a hand-held stylus, a computer mouse, a joystick, or any other suitable device having at least one degree of rotational freedom that can be used to record various hand motions of user 50. Physical manipulations of manual controller 400 by user 50 are ultimately converted into the physical motions of remote machinery 300 by control software 200. Manual controller 400 may also provide a haptic feedback response to user 50, corresponding to either physical environmental objects that exist at the remote location or to virtual barriers.

Manual controller 400 may be a stylus device that is a commercially available haptic feedback system including software libraries that are imported into tele-inspection software program 200. For example, tele-inspection software 200 queries manual controller/stylus device 400 using stylus software library functions for current axis positions and tele-inspection software 200 sets the haptic feedback response of manual controller/stylus device 400 by sending commands to manual controller/stylus device 400 using the stylus software library functions. Manual controller/stylus device 400 applies the commanded settings from tele-inspection software 200 to produce a sensation response felt by local user 50 holding manual controller/stylus device 400. The commanded settings change the servo-motor power and response characteristics which produce sensations of touching surfaces of different densities or at differing levels of force, mass, gravity or speed. Tele-inspection software 200 determines the settings for the type of response based on the current location of remote machinery 300 and from analysis of the data queried from sensors 500, 600, and 700.

Environmental sensors 500 may include cameras, microphones, digitizers, and other types of sensing devices, and may use optical systems, devices, and methods for determining the displacement of physical objects within remote working environment 30 that encompasses remote machinery 300 and the tele-inspection process that is occurring therein. Environmental sensors 500 may also use auditory systems, devices, and methods for capturing sounds within remote working environment 30 that encompasses remote machinery 300 and the tele-inspection process that is occurring therein. Sensors 500, 600, and 700 may be used to collect digitized environmental data (e.g., point clouds) that is transmitted to and stored on processor 100. This digital environmental data may then be used to determine when, how, and what type of physical sensation response is to be applied to the manual controller 400 for indicating the presence of a physical object in remote working environment 30 or proximity to a physical object or virtual barrier. With regard to weld-inspection processes: (i) inexpensive, digital cameras may be used to assist with proper line-up and grinder placement on welded material; (ii) specialty weld-inspection process cameras may be used to provide a real-time grind view; (iii) microphones may be used to add inspection sounds to enable an experienced weld-grinder to accurately grind welded material remotely; and (iv) livestreaming camera video and audio may be used to provide low latency real-time process data.

Three-dimensional sensors 600, which cooperate with environmental sensors 500, may be mounted to machinery and/or robot 300 to measure the displacement of objects relative to the sensors themselves and provide a digitized topographical representation of the physical environment in which the weld-inspection process is occurring. Optically-based processes such as, for example, infrared (IR), laser detection and ranging (LIDAR), blue, white, or laser vibrometer scanning systems can be used to create a point cloud or three-dimensional digital map of remote working environment 30. Scanning and digitizing may be completed prior to the inspection process or may be completed in real-time as the weld-inspection process is occurring. User 50 may provide tele-inspection control software 200 with a specified maximum value or amount of weld part surface intended to be removed. With regard to the weld-inspection process, three-dimensional sensors 600 may be used to: (i) inspect a part/material surface; and (ii) measure the distance between the inspection equipment/inspection probe and the inspection surface.

Process sensors 700, which cooperate with sensors 500 and 600, may be mounted to machinery/robot 300 or positioned in the inspection environment to measure pressure, force, and/or strain applied between the inspection probe and the inspection surface. Data and information gathered from sensors 500, 600, and 700 may be used to: (i) override user control of machinery/robot 300 if pressure, force, and/or distance exceed predetermined operating parameter ranges; (ii) adjust haptic feedback response on manual controller/stylus device 400; and (iii) control and update the motion and speed of machinery/robot 300 in the X, Y, Z, Rx, Ry, and Rz directions. It is to be understood that the predetermined operating parameter ranges are any ranges of pressure, force, and/or distance that allow machinery/robot 300 robot to function without crashing.

Tele-inspection system 10 provides real-time video and audio feedback of remote working environment 30 to user 50 in local environment 20. Video, audio, or other sensor data is encoded using commercially available encoding hardware servers or an encoding software program running on a processor. Server or processor 100, using commercially available software, publishes the encoded video and audio or other data stream to the internet or a LAN through a URL or web address 1000. The published livestream uses a low latency protocol to stream the information to devices over the internet or on a local area network (LAN) 1000. User 50 can access livestreamed video over the internet or LAN 1000 using a processor (e.g., a personal computer) and commercial media player application that can read and play the audio or video stream on a personal computer.

Figure 2B:
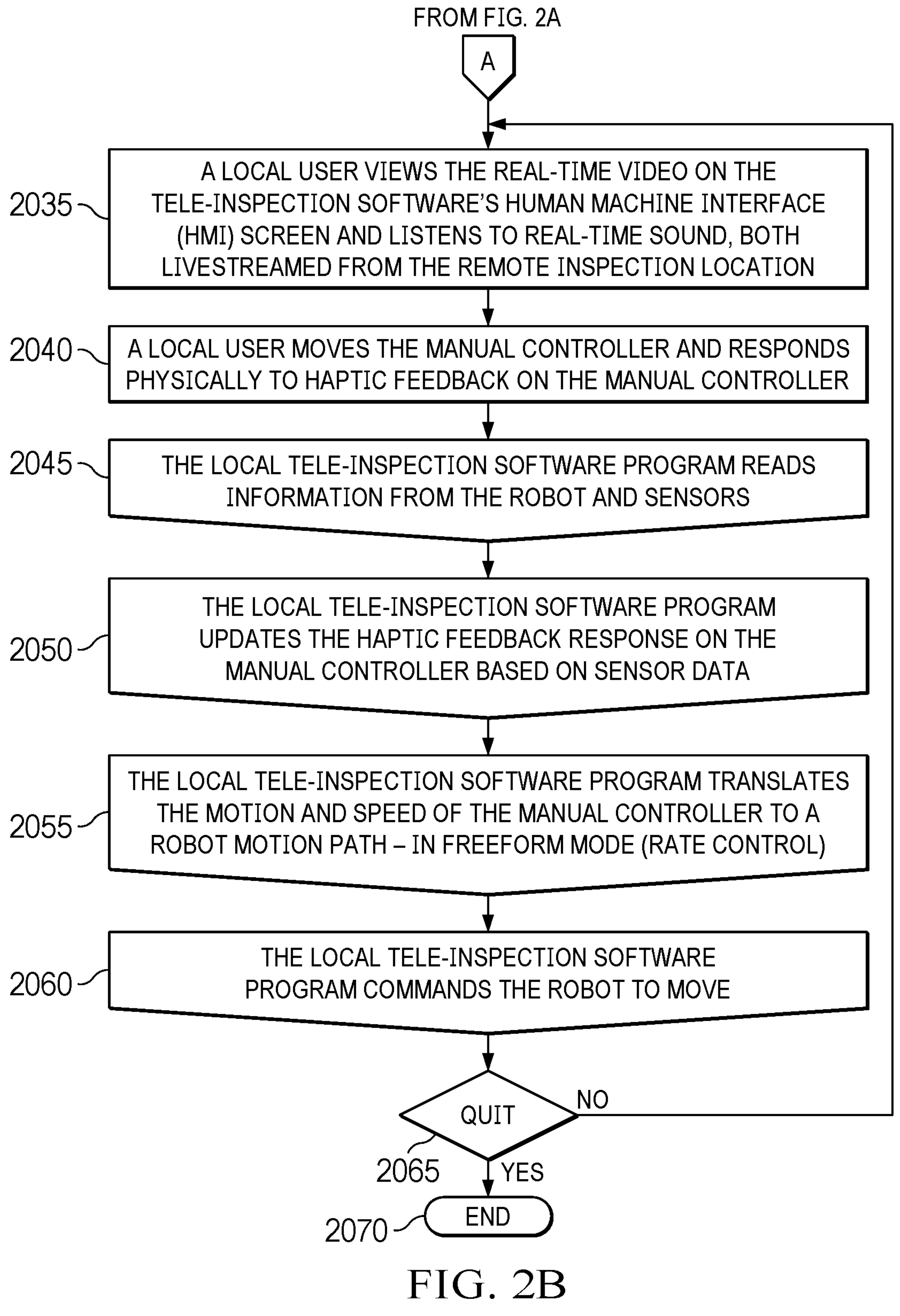

FIGS. 2A-2B provide a flow chart of an example method or process for using an example implementation of the disclosed tele-inspection system. In FIG. 2A, the method starts at step 2000. A local user remote from the inspection process and the inspection environment initiates a local tele-inspection software program previously installed on a processor at step 2005. As previously discussed, the processor may be a computer or computing device that includes control hardware. The local tele-inspection software program then connects to a remote robot using point-to-point, LAN, or internet connection at step 2010. Remote environmental sensors connected to the robot send data to the robot at step 2015. Remote cameras microphones stream video and sound directly to the processor, to the LAN, or over the internet at step 2020. The local processor then connects to a livestream media software program, a web browser, or a locally installed camera viewer program at step 2025. At step 2030, the software program connects to a local manual controller that is coupled to the local processor. As previously discussed, the local manual controller may be a hand-held stylus, a computer mouse, a joystick, or any other suitable device. The local user then views real-time video on the tele-inspection software program's human machine interface (HMI) screen and listens to real-time sound that are both livestreamed from the remote inspection environment at step 2035. Next, the local user manipulates the manual controller and responds physically to a haptic feedback response on the manual controller at step 2040.

With reference to FIG. 2B, the local tele-inspection software program receives and reads information from the robot and the remote sensors at step 2045. The software program then updates the haptic feedback response on the manual controller based on the data from the remote sensors at step 2050. At step 2055, the software program translates the motion and speed of the manual controller to a robot motion path. The tele-inspection software program then commands the robot to move at step 2060. The system then determines whether or not to terminate (quit) the process at step 2065 and either ends the process at step 2070 or continues the process from step 2035.

FIG. 3 provides a flow chart of an example stepwise decision process for reading information from remote robot 300 and the remote sensors at step 2045 (see FIG. 2B). At step 2100, PAUT or Eddy current inspection probes are coupled to the end of the robot, and the tele-inspection software program reads data from: (i) a torch height sensor that affects Z-axis (inspection probe to part surface distance) movement of the robot; and (ii) a pressure sensor that measures pressure from a force applied from the robot to the part's surface. The system alerts the local user by displaying a video of the inspection environment on the HMI screen at step 2110. The system then alerts the local user by updating the haptic feedback response on the manual controller at step 2120.

With further reference to FIG. 3, the system evaluates whether the measured distance between the inspection probe and the inspection surface is out of range (robot is too close to part surface) at decision step 2130. If the measured distance is out of range, the system decides whether to override the local user's control to prevent robot crash at step 2150. If the system overrides the local user's axis control, local user control of the robot's affected axis is disabled at step 2160 and restarts the process at step 2100. The system will enable or continue local user control of the robot at step 2140 if the measured distance is not out of range at decision step 2130. Next, the system evaluates whether the measured pressure from the pressure sensor is out of range (robot is applying too great of pressure on part surface) at decision point 2170. The system will enable or continue local user control of the robot at step 2180 if the measured pressure is not out of range at decision step 2170 and restarts the process at step 2100. If the measured pressure is out of range, the system decides whether to override the local user's control to prevent robot crash at step 2190. If the system overrides the local user's axis control, local user control of the robot's affected axis is disabled at step 2195 and restarts the process at step 2100. If the system does not override the local user's axis control, the process continues at step 2100.

Figure 4:
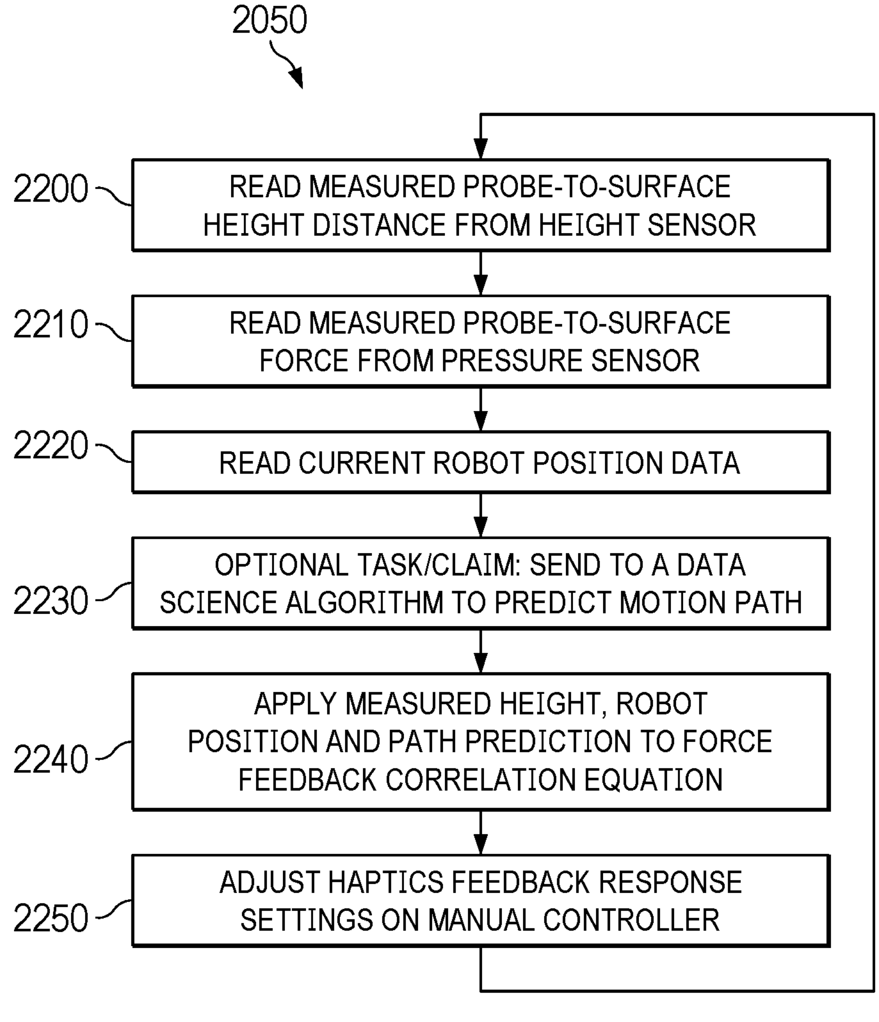
FIG. 4 is a flow chart illustrating an example stepwise process for updating a haptic feedback response on a local manual controller used with a remote manufacturing environment in conjunction with the method depicted in FIGS. 2A-2B.

FIG. 4 provides a flow chart of an example stepwise process for updating the haptic feedback response on the manual controller at step 2050 (see FIG. 2B). Initially, the tele-inspection software program: (i) reads the measured probe-to-surface height distance from the torch height sensor at step 2200; (ii) reads the measured probe-to-surface force from the pressure sensor at step 2210; and (iii) reads the current robot position data at step 2220. At optional step 2230, the software program sends the information read in steps 2200, 2210, and 2220 to a data science algorithm to predict the robot's motion path. The system then applies the information from steps 2200, 2210, 2220, and 2230 to force feedback correlation equation at step 2240. At step 2250, the software program adjusts the haptics feedback response on the manual controller and continues the process from step 2200.

Figure 5:
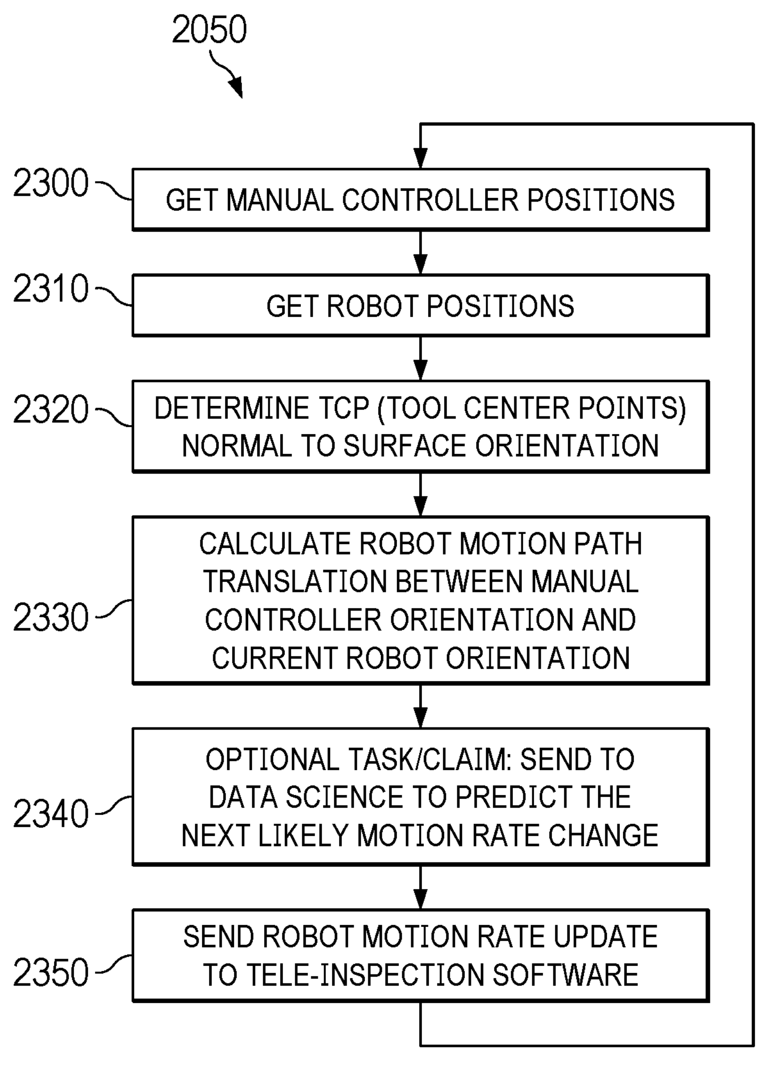
FIG. 5 is a flow chart illustrating an example stepwise process for translating motion and speed of a local manual controller to a robot motion path in conjunction with the method depicted in FIGS. 2A-2B.

FIG. 5 provides a flow chart of an example stepwise process for translating motion and speed of the manual controller to the robot's motion path at step 2055 (see FIG. 2B). Initially, the tele-inspection software program obtains the manual controller positions at step 2300 and obtains the robot positions at step 2310. The software program then determines the tool center points (TCP) normal to surface orientation at step 2320. The robot's motion path translation between the manual controller orientation and the current robot orientation is calculated at step 2330. At optional step 2340, the robot's motion path translation is sent to data science to predict the next likely motion rate change. At step 2350, the robot's motion rate update is sent to the tele-inspection software and continues the process from step 2300.

Figure 6:
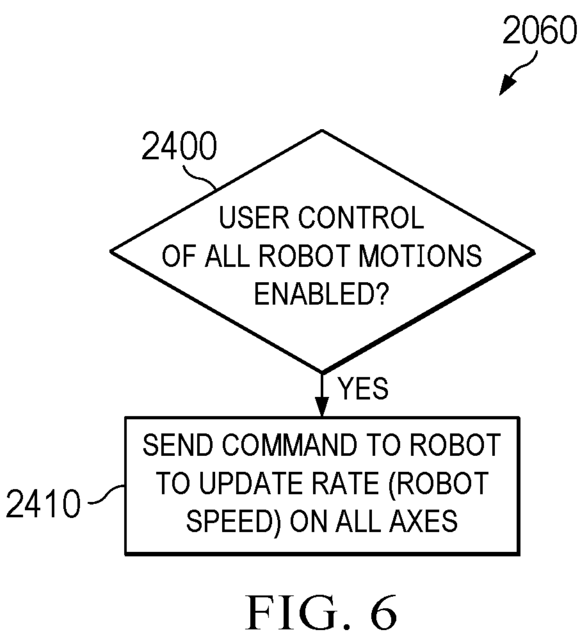
FIG. 6 is a flow chart illustrating an example stepwise process for commanding a remote robot to move in conjunction with the method depicted in FIGS. 2A-2B.

FIG. 6 provides a flow chart of an example stepwise decision process for commanding the robot to move at step 2060 (see FIG. 2B). Initially, the system evaluates, at decision step 2400, whether user control of all robot motions is enabled. If user control is enabled, a command is sent to the robot to update is rate (speed) on all axes of motion at step 2410.

All literature and similar material cited in this application, including, but not limited to, patents, patent applications, articles, books, treatises, and web pages, regardless of the format of such literature and similar materials, are expressly incorporated by reference in their entirety. Should one or more of the incorporated references and similar materials differ from or contradict this application, including but not limited to defined terms, term usage, described techniques, or the like, this application controls.

As previously stated and as used herein, the singular forms "a," "an," and "the," refer to both the singular as well as plural, unless the context clearly indicates otherwise. The term "comprising" as used herein is synonymous with "including," "containing," or "characterized by," and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about", if or when used throughout this specification describe and account for small fluctuations, such as due to variations in processing. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%, and/or 0%.

Underlined and/or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed technology. Various functions and elements described herein may be partitioned differently from those shown without departing from the scope of the disclosed technology. Generic principles defined herein may be applied to other implementations. Different numbers of a given module or unit may be employed, a different type or types of a given module or unit may be employed, a given module or unit may be added, or a given module or unit may be omitted.

Regarding this disclosure, the term "a plurality of" refers to two or more than two. Unless otherwise clearly defined, orientation or positional relations indicated by terms such as "upper" and "lower" are based on the orientation or positional relations as shown in the figures, only for facilitating description of the disclosed technology and simplifying the description, rather than indicating or implying that the referred devices or elements must be in a particular orientation or constructed or operated in the particular orientation, and therefore they should not be construed as limiting the disclosed technology. The terms "connected", "mounted", "fixed", etc. should be understood in a broad sense. For example, "connected" may be a fixed connection, a detachable connection, or an integral connection; a direct connection, or an indirect connection through an intermediate medium. For an ordinary skilled in the art, the specific meaning of the above terms in the disclosed technology may be understood according to specific circumstances.

Specific details are given in the above description to provide a thorough understanding of the disclosed technology. However, it is understood that the disclosed embodiments and implementations can be practiced without these specific details. For example, circuits can be shown in block diagrams in order not to obscure the disclosed implementations in unnecessary detail. In other instances, well-known circuits, processes, algorithms, structures, and techniques can be shown without unnecessary detail in order to avoid obscuring the disclosed implementations.

Implementation of the techniques, blocks, steps and means described above can be accomplished in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

The disclosed technology can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, the disclosed technology can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

It should be appreciated that all combinations of the foregoing concepts and additional concepts discussed in greater detail herein (provided such concepts are not mutually inconsistent) are contemplated as being part of the disclosed technology. In particular, all combinations of claimed subject matter appearing at the end of this disclosure are contemplated as being part of the technology disclosed herein. While the disclosed technology has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed technology in its broader aspects is not limited to any of the specific details, representative devices and methods, and/or illustrative examples shown and described. Accordingly, departures may be made from such details without departing from the spirit or scope of the general inventive concept.

What is claimed:

1. A method for controlling an inspection process used in a manufacturing environment, comprising:

(a) installing equipment used for or related to an inspection process in a manufacturing environment;

(b) positioning a plurality of sensors within the manufacturing environment in proximity to the inspection equipment, wherein the plurality of sensors are configured to gather data from the manufacturing environment;

(c) connecting at least one processor to the plurality of sensors, wherein the at least one processor includes software for receiving data from the plurality of sensors and the inspection equipment (d) connecting at least one manual controller to the processor, wherein the at least one manual controller receives motion input from a user of the manual controller, wherein the software on the processor mathematically transforms the motion input into corresponding motion commands that are sent to the inspection equipment by the processor, wherein the inspection equipment, which is physically remote from the at least one controller, executes the motion commands in real-time during the manufacturing inspection process; and (e) providing a computer network across which the processor communicates with the inspection equipment.

2. The method of claim 1, wherein the inspection equipment includes a robot having an end effector for evaluating the integrity of welded material, and wherein the end effector includes a PAUT probe, an Eddy current probe, or combinations thereof.

3. The method of claim 2, further comprising:
(a) using at least one of the sensors in the plurality of sensors to measure a distance between the end effector and the welded material; and
(b) disabling the user's control of the inspection equipment if the distances varies from a predetermined operating distance range.

4. The method of claim 3, further comprising:
(a) reading the measured distance between the end effector and the welded material;
(b) providing a haptic feedback response to the manual controller based on the data from the plurality of sensors and the inspection equipment; and
(c) updating the haptic feedback response to the manual controller based on the measured distance.

5. The method of claim 2, further comprising:
(a) using at least one of the sensors in the plurality of sensors to measure a pressure applied between the end effector and the welded material; and
(b) disabling the user's control of the inspection equipment if the pressure varies from a predetermined operating pressure range.

6. The method of claim 5, further comprising:
(a) reading the measured pressure applied between the end effector and the welded material;
(b) providing a haptic feedback response to the manual controller based on the data from the plurality of sensors and the inspection equipment; and
(c) updating the haptic feedback response to the manual controller based on the measured pressure.

7. The method of claim 1, wherein the at least one manual controller is a hand-held stylus, a computer mouse, or a joystick.

8. The method of claim 2, wherein the robot moves with at least six degrees of freedom.

9. The method of claim 1, further comprising displaying a real-time video of the manufacturing environment to the user during the inspection process.

10. A method for controlling an inspection process used in a manufacturing environment, comprising:
(a) installing equipment used for or related to an inspection process in a manufacturing environment;
(b) positioning a plurality of sensors within the manufacturing environment in proximity to the inspection equipment, wherein the plurality of sensors are configured to gather data from the manufacturing environment;
(c) connecting at least one processor to the plurality of sensors, wherein the at least one processor includes software for receiving data from the plurality of sensors and the inspection equipment;
(d) connecting at least one manual controller to the processor, wherein the at least one manual controller receives motion input from a user of the manual controller, wherein the software on the processor mathematically transforms the motion input into corresponding motion commands that are sent to the inspection equipment by the processor, wherein the inspection equipment, which is physically remote from the at least one controller, executes the motion commands in real-time during the manufacturing inspection process;
(e) providing a computer network across which the processor communicates with the inspection equipment; and
(f) displaying a real-time video of the manufacturing environment to the user during the inspection process.

11. The method of claim 10, wherein the inspection equipment includes a robot having an end effector for evaluating the integrity of welded material, wherein the end effector includes a PAUT probe, an Eddy current probe, or combinations thereof.

12. The method of claim 11, further comprising:
(a) using at least one of the sensors in the plurality of sensors to measure a distance between the end effector and the welded material; and
(b) disabling the user's control of the inspection equipment if the distances varies from a predetermined operating distance range.

13. The method of claim 12, further comprising:
(a) reading the measured distance between the end effector and the welded material;
(b) providing a haptic feedback response to the manual controller based on the data from the plurality of sensors and the inspection equipment; and
(c) updating the haptic feedback response to the manual controller based on the measured distance.

14. The method of claim 11, further comprising:
(a) using at least one of the sensors in the plurality of sensors to measure a pressure applied between the end effector and the welded material; and
(b) disabling the user's control of the inspection equipment if the measured pressure varies from a predetermined operating pressure range.

15. The method of claim 14, further comprising:
(a) reading the measured pressure applied between the end effector and the welded material;
(b) providing a haptic feedback response to the manual controller based on the data from the plurality of sensors and the inspection equipment; and
(c) updating the haptic feedback response to the manual controller based on the measured pressure.

16. The method of claim 14, further comprising continuing the user's control of the inspection equipment if the measured pressure is within the predetermined operating pressure range.

17. The method of claim 10, wherein the at least one manual controller is a hand-held stylus, a computer mouse, or a joystick.

18. The method of claim 11, wherein the robot moves with at least six degrees of freedom.

* * * * *